(12) United States Patent
Nabeto et al.

(10) Patent No.: US 12,087,027 B2
(45) Date of Patent: Sep. 10, 2024

(54) OBJECT RECOGNITION APPARATUS, OBJECT RECOGNITION METHOD, AND RECORDING MEDIUM

(71) Applicant: NEC Corporation, Tokyo (JP)

(72) Inventors: Yu Nabeto, Tokyo (JP); Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 17/792,841

(22) PCT Filed: Jan. 31, 2020

(86) PCT No.: PCT/JP2020/003712
§ 371 (c)(1),
(2) Date: Jul. 14, 2022

(87) PCT Pub. No.: WO2021/152829
PCT Pub. Date: Aug. 5, 2021

(65) Prior Publication Data
US 2023/0039355 A1    Feb. 9, 2023

(51) Int. Cl.
*G06V 10/22*  (2022.01)
*G06F 16/901*  (2019.01)

(52) U.S. Cl.
CPC .......... *G06V 10/22* (2022.01); *G06F 16/9014* (2019.01); *G06V 2201/07* (2022.01)

(58) Field of Classification Search
None
See application file for complete search history.

(56) References Cited

U.S. PATENT DOCUMENTS

| | | | |
|---|---|---|---|
| 9,177,225 B1* | 11/2015 | Cordova-Diba | G06T 7/12 |
| 10,282,607 B2* | 5/2019 | García | G06V 10/754 |
| 11,475,800 B2* | 10/2022 | Wang | G09F 3/208 |
| 2007/0253623 A1 | 11/2007 | Ohira et al. | |

(Continued)

FOREIGN PATENT DOCUMENTS

| | | |
|---|---|---|
| JP | 2007-299210 A | 11/2007 |
| JP | 2008-287438 A | 11/2008 |
| JP | 2019-040227 A | 3/2019 |

OTHER PUBLICATIONS

Marder, Mattias, et al. "Using image analytics to monitor retail store shelves." IBM Journal of Research and Development 59.2/3 (2015): 3-1. (Year: 2015).*

(Continued)

*Primary Examiner* — Michelle M Entezari Hausmann (57) ABSTRACT

In an object recognition apparatus, a storage unit stores a table in that a plurality of feature amounts are associated with each object having feature points of respective feature amounts. An object region detection unit detects object regions of a plurality of objects from an input image. A feature amount extraction unit extracts feature amounts of feature points from the input image. A refining unit refers to the table, and refines from all objects of recognition subjects to object candidates corresponding to the object regions based on feature amounts of feature points belonging to the object regions. A matching unit recognizes the plurality of objects by matching the feature points belonging to each of the object regions with feature points for each of the object candidates, and outputs a recognition result.

13 Claims, 8 Drawing Sheets

(56) References Cited

U.S. PATENT DOCUMENTS

| | | | |
|---|---|---|---|
| 2008/0095465 A1* | 4/2008 | Mullick | G06T 7/33 |
| | | | 382/284 |
| 2008/0304753 A1 | 12/2008 | Sohma et al. | |
| 2010/0027895 A1* | 2/2010 | Noguchi | G06V 10/764 |
| | | | 382/224 |
| 2012/0314938 A1* | 12/2012 | Abdo | G06F 18/217 |
| | | | 382/165 |
| 2013/0266195 A1* | 10/2013 | Shiell | G06V 40/172 |
| | | | 382/118 |
| 2015/0125835 A1* | 5/2015 | Wittich | G09B 5/065 |
| | | | 434/335 |
| 2019/0005323 A1* | 1/2019 | Kimura | G06V 30/412 |
| 2019/0205433 A1* | 7/2019 | Lo | G06F 18/211 |
| 2019/0236531 A1* | 8/2019 | Adato | H04N 23/80 |
| 2020/0234227 A1* | 7/2020 | Gadou | G06Q 10/087 |
| 2020/0380317 A1* | 12/2020 | Ghazel | G06F 18/2433 |
| 2020/0380709 A1* | 12/2020 | Ben-Lavi | G06V 10/255 |
| 2021/0125360 A1* | 4/2021 | Nguyen | G06T 7/136 |

OTHER PUBLICATIONS

Milella, Annalisa, et al. "Towards intelligent retail: Automated on-shelf availability estimation using a depth camera." IEEE Access 8 (2020): 19353-19363. (Year: 2020).*

Solti, Andreas, et al. "Misplaced product detection using sensor data without planograms." Decision Support Systems 112 (2018): 76-87. (Year: 2018).*

Falcão, João, et al. "Faim: Vision and weight sensing fusion framework for autonomous inventory monitoring in convenience stores." Frontiers in Built Environment 6 (2020): 568372. (Year: 2020).*

International Search Report for PCT Application No. PCT/JP2020/003712, mailed on Mar. 24, 2020.

* cited by examiner

<ITEM IMAGE>

FIG. 5

<FEATURE AMOUNT EXTRACTION>

OBJECT RECOGNITION APPARATUS, OBJECT RECOGNITION METHOD, AND RECORDING MEDIUM

This application is a National Stage Entry of PCT/JP2020/003712 filed on Jan. 31, 2020, the contents of all of which are incorporated herein by reference, in their entirety.

TECHNICAL FIELD

The present invention relates to a technique for recognizing an object from a captured image.

BACKGROUND ART

For a purpose of an inventory control in a store or the like, a technique for recognizing individual items from a captured image of the items in a display shelf has been proposed. Patent Document 1 describes an inventory management system in which image feature amounts are extracted from each object region in a captured image by an object region extraction function and an image feature amount extraction function, and are matched with respective image masters registered in a DB server so as to specify an object and acquire a quantity of objects.

PRECEDING TECHNICAL REFERENCES

Patent Document

Patent Document 1: Japanese Laid-open Patent Publication No. 2019-40227

SUMMARY

Problem to be Solved by the Invention

In a technique of Patent Document 1, since it is necessary to match feature amounts extracted from a captured image with respective image masters of a large number of items, there is a problem that it takes a processing time in a case of recognizing a large number of items.

It is one object of the present invention to provide an object recognition method capable of efficiently recognizing a large number of objects.

Means for Solving the Problem

According to an example aspect of the present invention, there is provided an object recognition apparatus including:
a storage unit configured to store a table in that a plurality of feature amounts are associated with each object having feature points of respective feature amounts;
an object region detection unit configured to detect object regions of a plurality of objects from an input image;
a feature amount extraction unit configured to extract feature amounts of feature points from the input image;
a refining unit configured to refer to the table, and refine from all objects of recognition subjects to object candidates corresponding to the object regions based on feature amounts of feature points belonging to the object regions; and
a matching unit configured to recognize the plurality of objects by matching the feature points belonging to each of the object regions with feature points for each of the object candidates, and output a recognition result.

According to another example aspect of the present invention, there is provided an object recognition method, including:
detecting object regions of a plurality of objects from an input image;
extracting feature amounts of feature points from the input image;
referring to a table in that a plurality of feature amounts are associated with each object having feature points of respective feature amounts, and refining from all objects of recognition subjects to object candidates corresponding to the object regions based on feature amounts of feature points belonging to the object regions; and
recognizing the plurality of objects by matching the feature points belonging to each of the object regions with feature points for each of the object candidates, and outputting a recognition result.

According to still another example aspect of the present invention, there is provided a recording medium storing a program, the program causing a computer to perform a process including:
detecting object regions of a plurality of objects from an input image;
extracting feature amounts of feature points from the input image;
referring to a table in that a plurality of feature amounts are associated with each object having feature points of respective feature amounts, and refining from all objects of recognition subjects to object candidates corresponding to the object regions based on feature amounts of feature points belonging to the object regions; and
recognizing the plurality of objects by matching the feature points belonging to each of the object regions with feature points for each of the object candidates, and outputting a recognition result.

Effect of the Invention

According to the present disclosure, it becomes possible to efficiently recognize a large number of objects.

EXAMPLE EMBODIMENTS

In the following, example embodiments will be described with reference to the accompanying drawings.

First Example Embodiment

[Object Recognition Apparatus]

Figure 1:
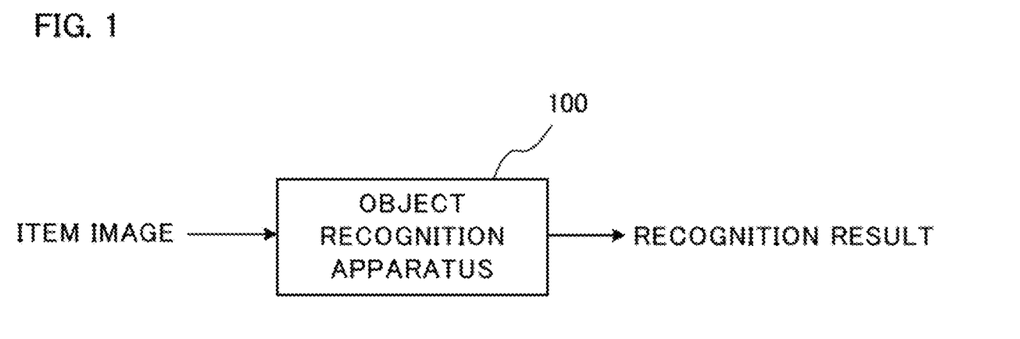
FIG. 1 illustrates an object recognition apparatus according to a first example embodiment.

FIG. 1 illustrates an object recognition apparatus according to a first example embodiment. An image of an item is input to the object recognition apparatus 100. The image of the item is an image taken from a front of an item shelf of a store, for instance, and includes a plurality of items displayed on the shelf. Usually, different types of items are displayed on the item shelf, and the object recognition apparatus 100 recognizes which item each item is, and outputs a recognition result. The recognition result is used for a replenishment work of items to item shelves, an inventory control in a store, and the like. An application of the present disclosure is not limited to an item image, but is also used for recognition of, for instance, an object stacked on a floor.

In the present example embodiment, a feature amount file indicating feature amounts for each item to be recognized is generated in advance. After that, the object recognition apparatus 100 sequentially matches feature points extracted from an item image with feature amounts for each item included in the feature amount file to recognize which item an item included in the item image is. However, since a process amount of the above-described matching process is large, in a case where the feature points of the item image are matched using feature amounts of all items in the feature amount file, the processing time becomes longer. Therefore, in the present example embodiment, after performing a refined search based on the feature amounts to reduce target items of a matching process, the matching process is actually performed. By this process, an overall processing time is reduced.

[Hardware Configuration]

Figure 2:
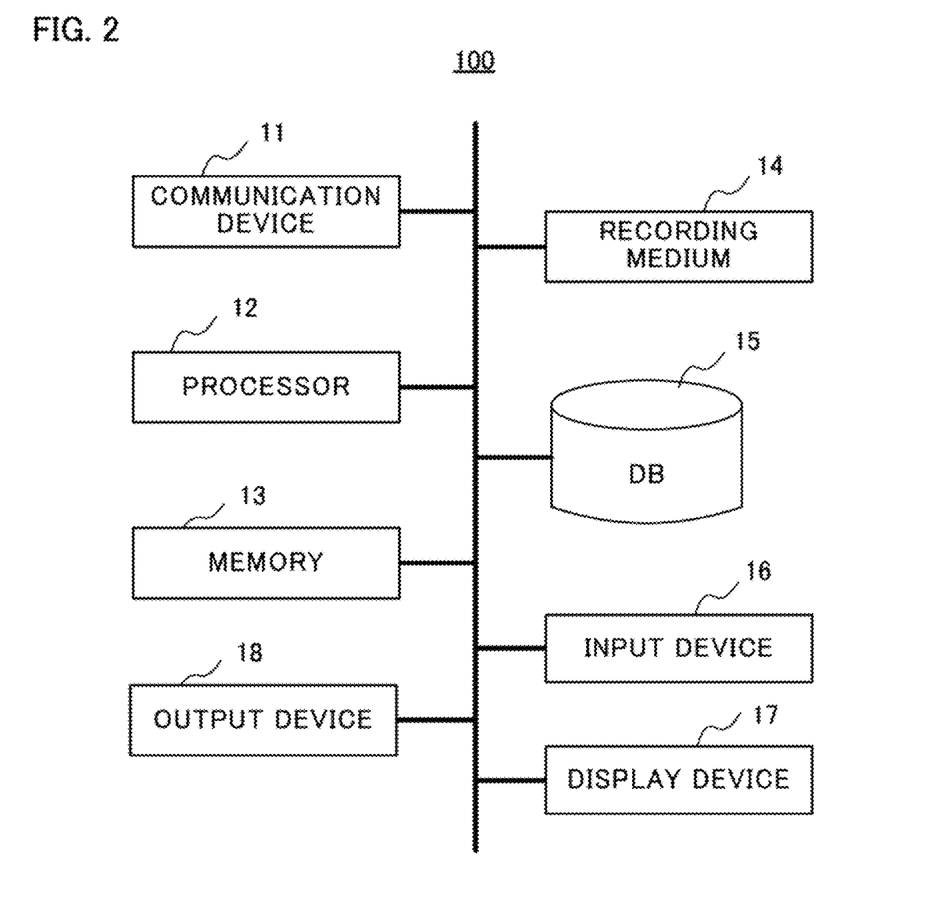
FIG. 2 is a block diagram illustrating a hardware configuration of the object recognition apparatus.

FIG. 2 is a block diagram illustrating a hardware configuration of the object recognition apparatus 100. As illustrated, the object recognition apparatus 100 includes an input IF (InterFace) 11, a processor 12, a memory 13, a recording medium 14, a database (DB) 15, an input device 16, a display device 17, and an output device 18.

The input IF 11 inputs and outputs data. In detail, the input IF 11 acquires an item image from an outside, and outputs a recognition result generated by the object recognition apparatus 100 based on the item image.

The processor 12 is a computer such as a CPU (Central Processing Unit) or a GPU (Graphics Processing Unit), and controls the entire object recognition apparatus 100 by executing programs prepared in advance. In particular, the processor 12 performs an object recognition process described later.

The memory 13 is formed by a ROM (Read Only Memory), RAM (Random Access Memory), or the like. The memory 13 stores various programs to be executed by the processor 12. The memory 13 is also used as a working memory during executions of various processes by the processor 12.

The recording medium 14 is a non-volatile and non-transitory recording medium such as a disk-shaped recording medium or a semiconductor memory, and is formed to be detachable from the object recognition apparatus 100. The recording medium 14 records various programs executed by the processor 12.

The DB 15 stores data input from the input IF 11. In detail, the DB 15 stores item images. Moreover, the DB 15 stores data used for recognizing an object, specifically, database files and feature amount files, which will be described later.

The input device 16 is, for instance, a keyboard, a mouse, a touch panel, or the like, and is used when a user performs necessary instructions and inputs in connection with a process by the object recognition apparatus 100. The display device 17 is, for instance, a liquid crystal display, the object recognition result is displayed. The output device 18 outputs the object recognition result to the external apparatus. For instance, the output device 18 may output an object recognition result to a POS (Point of Sale) terminal or the like through a network.

[Function Configuration]

Figure 3:
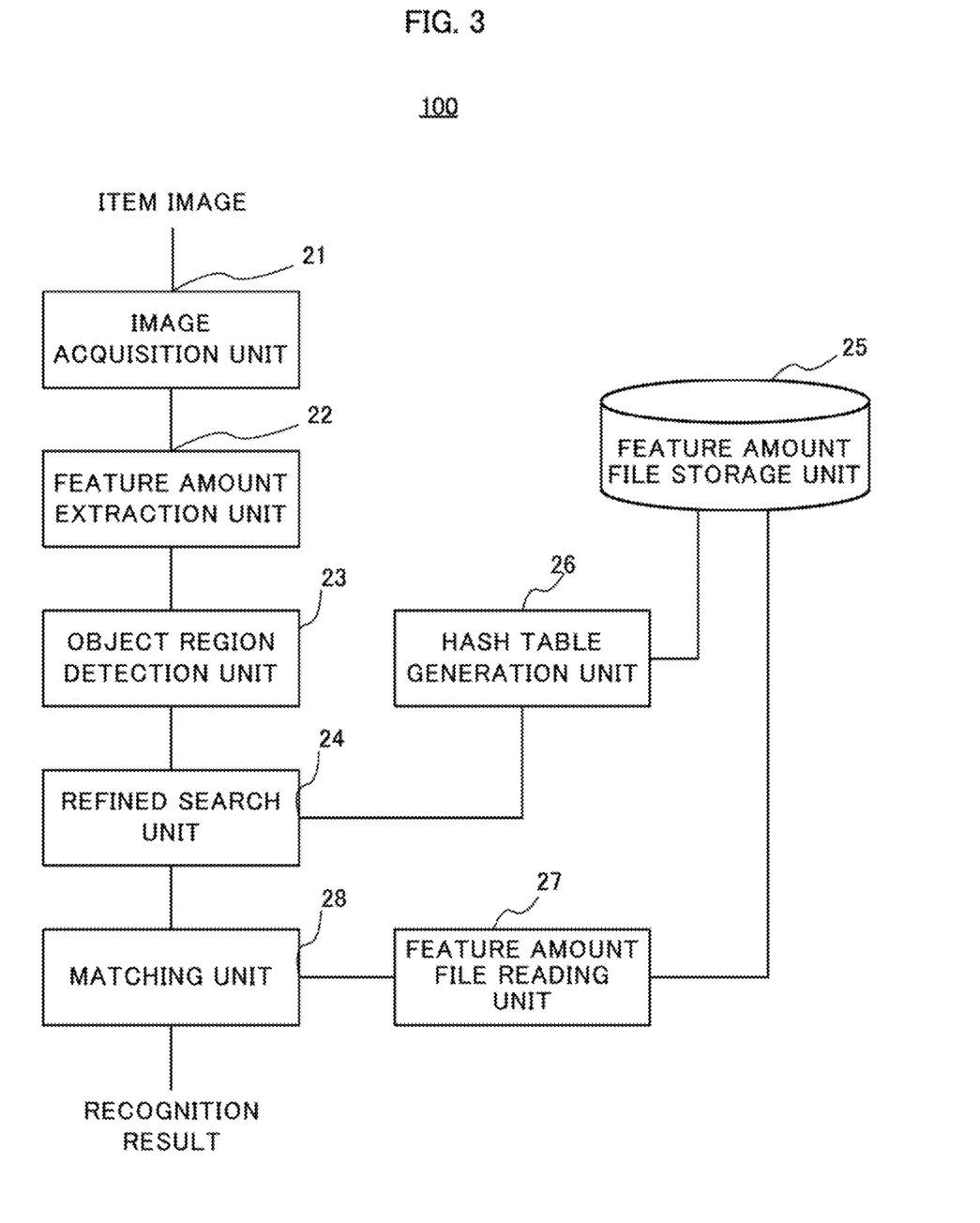
FIG. 3 is a block diagram illustrating a functional configuration of the object recognition apparatus.

FIG. 3 is a block diagram illustrating a functional configuration of the object recognition apparatus 100. The object recognition apparatus 100 includes an image acquisition unit 21, a feature amount extraction unit 22, an object region detection unit 23, a refined search unit 24, a feature amount file storage unit 25, a hash table generation unit 26, a feature amount file reading unit 27, and a matching unit 28.

Figure 4:
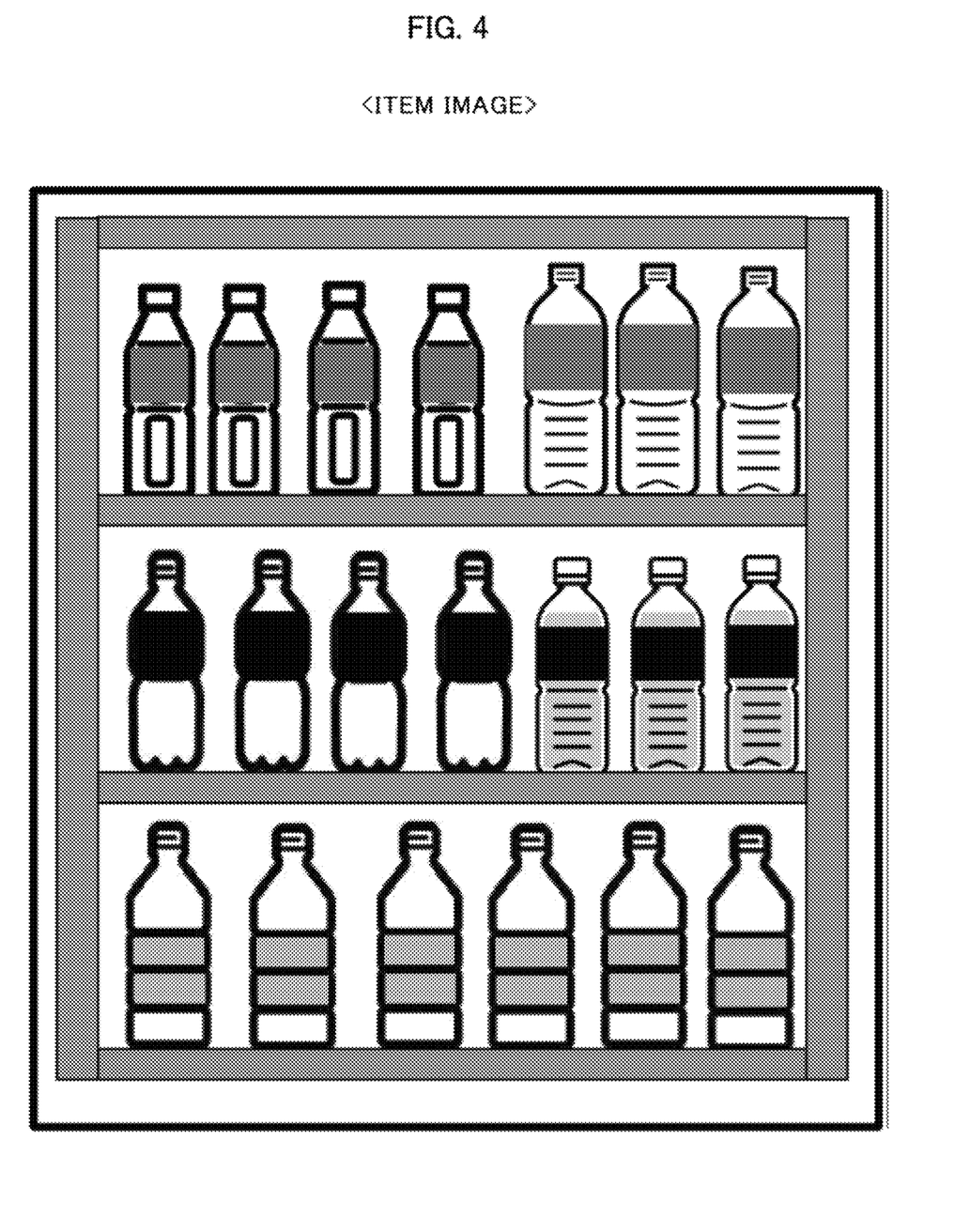
FIG. 4 illustrates an example of an item image.

The image acquisition unit 21 acquires an item image. FIG. 4 illustrates an example of the item image. The item image is, for instance, a captured image of an item shelf of a store, and includes a plurality of types of items. The image acquisition unit 21 outputs the acquired item image to the feature amount extraction unit 22.

Figure 5:
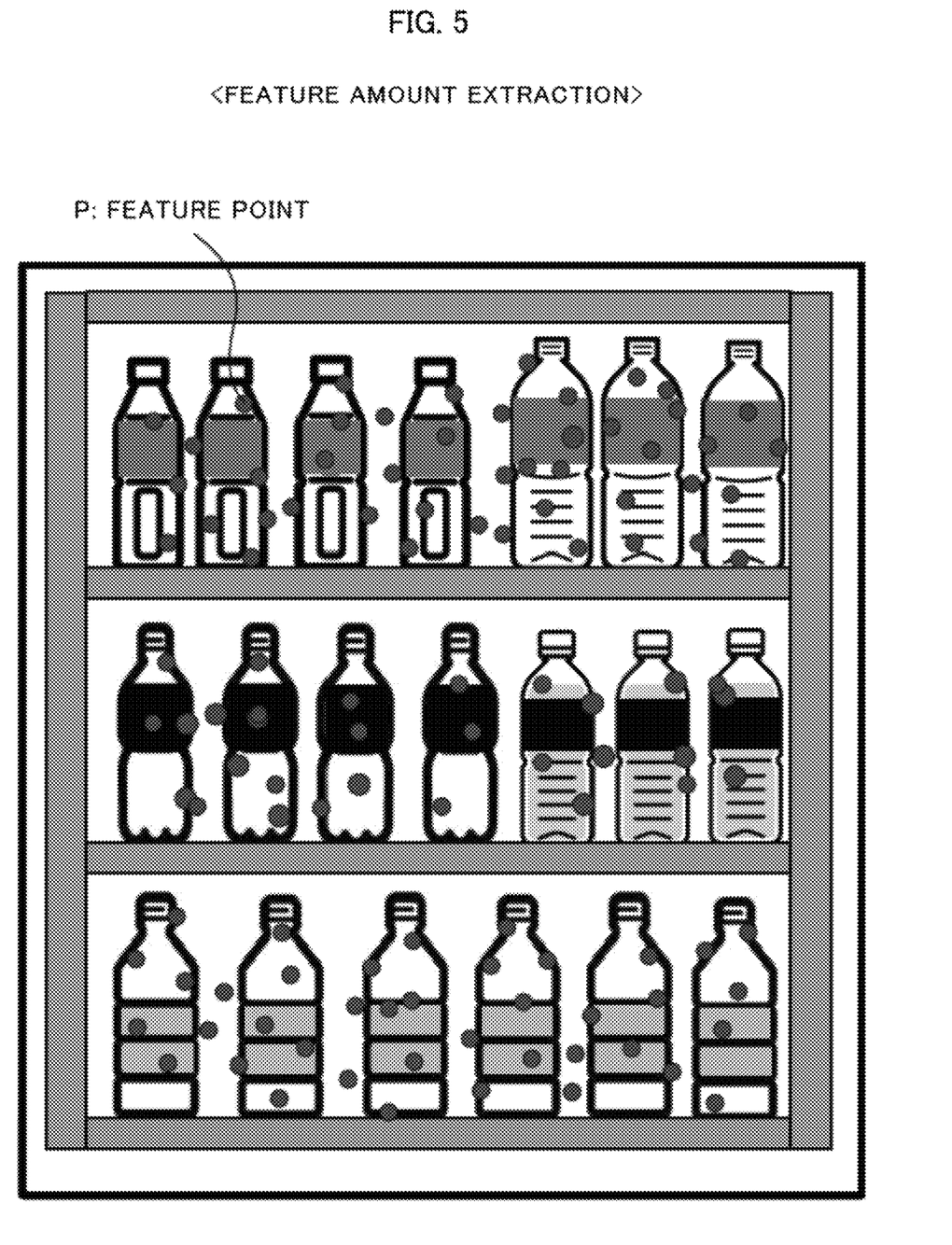
FIG. 5 schematically illustrates feature points extracted from the item image.

The feature amount extraction unit 22 extracts feature amounts from the item image. The feature amount extraction unit 22 detects feature points from the item image, and generates feature amounts at respective detected feature points. As the feature amounts, for instance, SIFT (Scale-Invariant Feature Transform) feature amounts or the like can be used. In a case of the SIFT feature amounts, feature points called key points are detected by smoothing an image or the like, and feature amounts by vectors of 128 dimensions indicating a gradient of brightness are extracted for respective feature points. The SIFT feature amount is an example of the feature amount used in this example embodiment, and is not limited thereto. FIG. 5 schematically illustrates feature points extracted in the item image. Each of feature points P is detected on or in a vicinity of an item in an item image. The feature amount extraction unit 22 outputs an item image and feature amount information related to the extracted feature amounts to the object region detection unit 23. The feature amount information includes position information for each of the feature points in the item image and the feature amount for each of the feature points.

Figure 6:
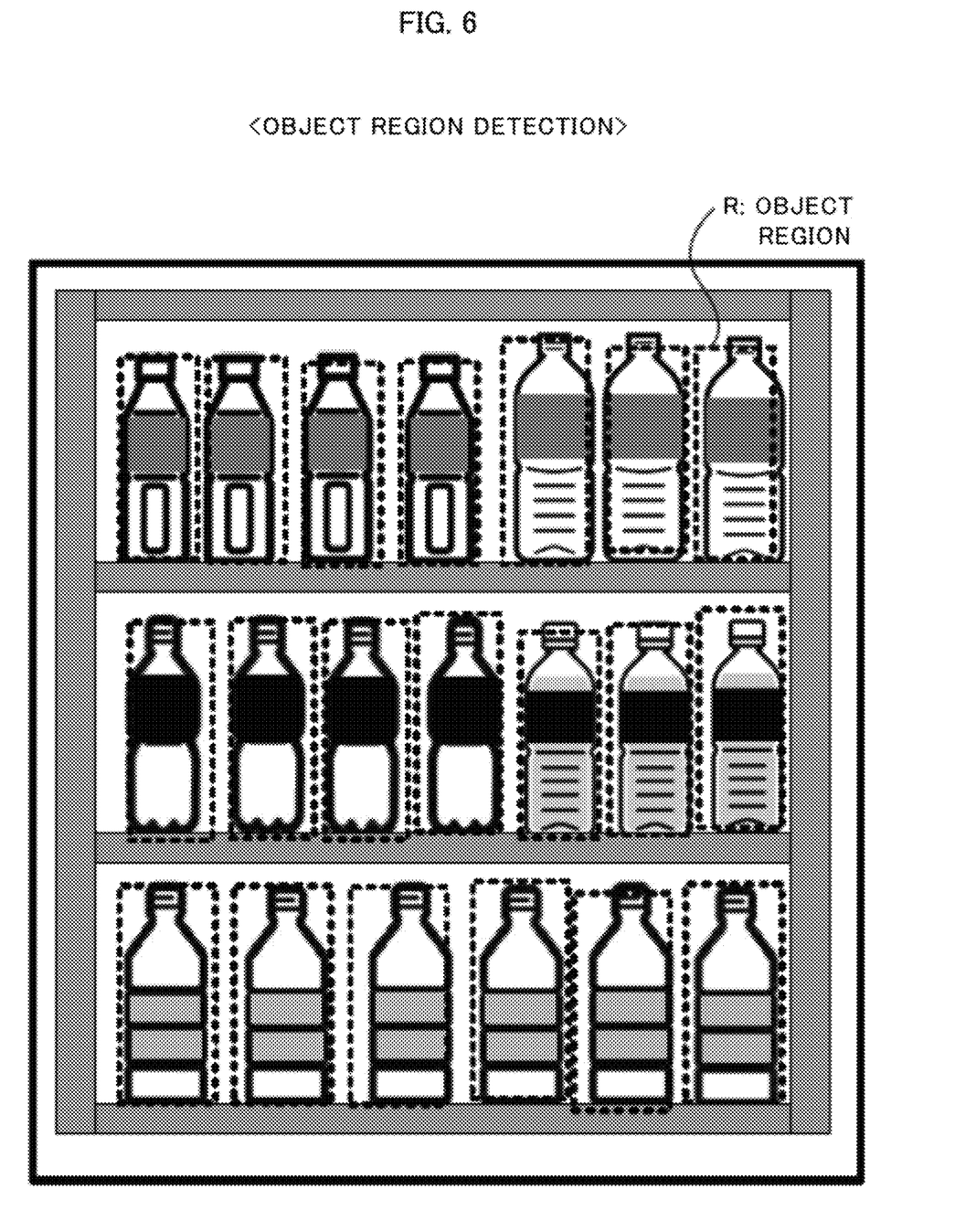
FIG. 6 illustrates an example of an object region detected from the item image.

The object region detection unit 23 detects an object region from the item image. The object region is regarded as a region corresponding to an individual item. The detection of the object region can be performed, for instance, by a region detection technique using a neural network. FIG. 6 illustrates an example of the object region detected from the item image. By detecting the object region, a rectangular object region R surrounding an individual item included in an item image is detected. The object region detection unit 23 outputs feature amount information and object region information to the refined search unit 24. The object region information includes position information of the object region R corresponding to the individual item included in the item image.

The feature amount file storage unit 25 stores the feature amount files. The feature amount file indicates feature amounts for each of a large number of items to be recognized by the object recognition apparatus 100. For items to be recognized, the feature amount extraction process as described above is performed in advance based on the captured image, and feature amount information possessed by the item is generated. That is, for an individual item, the position information of a plurality of feature points which the individual item has and respective feature amounts of the plurality of feature points are generated as a feature amount file and stored in the feature amount file storage unit 25.

Figure 7A:
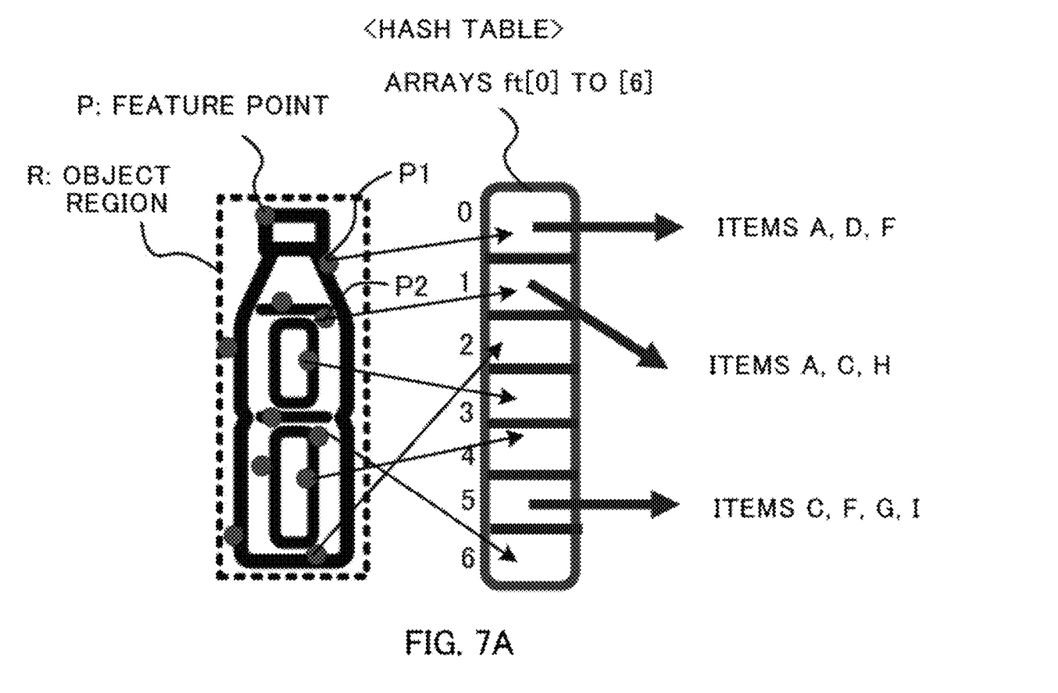
FIG. 7A illustrates an example of a hash table and FIG. 7B illustrates a search method.

The hash table generation unit 26 generates a hash table from the feature amount file. FIG. 7A illustrates an example of the hash table. The hash table generation unit 25 generates a hash value by inputting each feature amount obtained from the item image as a key to a predetermined hash function, and creates an array using respective hash values as indexes. In an example of FIG. 7A, respective feature amounts are converted into hash values of "0" to "6" using the hash function, and arrays ft[0] to ft[6] are created using the hash values as indexes. With respect to the arrays ft[0] to ft[6], an item having feature amounts classified into the arrays is assigned as a value. In the example of FIG. 7A, items A, D, and F having a feature amount of which the hash value indicates "0" are assigned to a value of the array ft[0]. In the same manner, items A, C, and H having a feature amount of which the hash value indicates "1" are assigned to a value of the array ft[1], and items C, F, G, and I having a feature amount of which the hash value indicates "5" are assigned to a value of the array ft[5]. As described above, the hash table generation unit 25 generates, as pre-processing, a hash table including all items as values to be recognized by the object recognition apparatus 100.

Figure 7B:
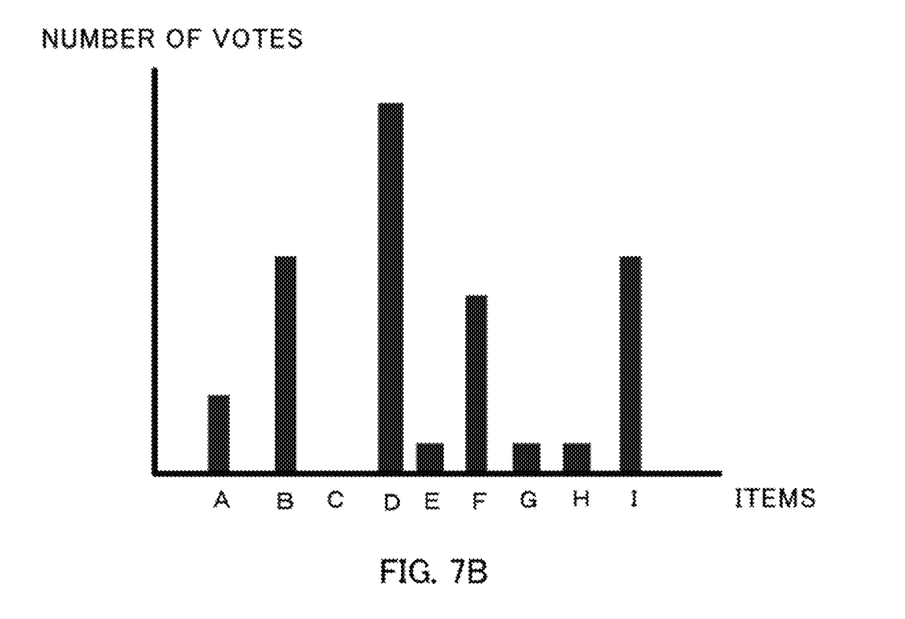

The refined search unit 24 performs a refined search (hash search) using the hash table. As described above, the object region information and the feature amount information are input to the refined search unit 24. First, the refined search unit 24 divides feature amounts based on respective object regions, and generates feature amounts for each of the object regions. Next, the refined search unit 24 performs voting using feature points on each of the object regions by using the hash table. In detail, as illustrated in FIG. 7A, for one object region R, the refined search unit 24 votes on items corresponding to feature amounts of individual feature points P included in the object region R. In an example of FIG. 7A, the refined search unit 24 refers to the hash table and gives one vote to each of the items A, D, and F based on a feature amount P1, and gives one vote to each of the items A, C, and H based on a feature amount P2. Accordingly, the refined search unit 24 votes on each item indicated by the hash table as a value based on all feature points corresponding to one object region R. FIG. 7B illustrates an example of a voting result thus obtained. A horizontal axis indicates types of items, and a vertical axis indicates a number of votes. The higher the number of votes in the voting result, the higher a probability that the item corresponds to an item of the object region R. In the example of FIG. 7B, the number of votes for the item D is the highest, and the item B and the item I are almost the same number and the second highest.

Therefore, the refined search unit 24 reduces items based on the number of votes of the voting result. For instance, the refined search unit 24 selects N items with the highest number of votes (for instance, up to top five when N=5) as item candidates. In another example, the refined search unit 24 arranges all items in an order of the number of votes, calculates a difference in the number of votes from an item of a next rank, and selects an item having a rank higher than that rank as an item candidate when the difference becomes equal to or more than a predetermined value. For instance, in a case where a predetermined number is "10", a difference in the number of votes between an item with the first place and an item with the second place is "5", a difference in the number of votes between the item with the second place and an item with the third place is "7", a difference in the number of votes between the item with the third place and an item with the fourth place is "11", the refined search unit 24 determines the items with the first place through the third place as item candidates. Accordingly, the refined search unit 24 performs the above-described process for all object regions R, determines item candidates for each object region R, and outputs a result to the matching unit 28. For instance, in a case of determining top N items in the number of votes as the item candidates, the refined search unit 24 outputs N item candidates for each of the object regions R detected from the item image.

The feature amount file reading unit 27 reads a feature amount file from the feature amount file storage unit 25, and outputs the feature amount file to the matching unit 28. The matching unit 28 performs matching of feature points with respect to the item candidates determined by the refined search unit 24. In detail, for individual object regions, the matching unit 28 matches feature points included in each object region with feature points of each item candidate determined by the refined search unit 24 with respect to each object region, and determines feature points having high similarity as corresponding points. For instance, in an example of FIG. 7B, in a case where the refined search unit 24 determines the item candidates to be items B, D, and I, the matching unit 28 matches feature amounts of the object region with feature amounts of the items B, D, and I in the feature amount file. The matching unit 28 determines, among a plurality of items included in the item candidates, an item having the most corresponding points as a recognition result for the object region, that is, an item existing in the object region. The matching unit 28 performs this process for all object regions, and outputs an item corresponding to each object region as a recognition result.

As described above, in the present example embodiment, the refined search unit 24 reduces all items to several item candidates, and the matching unit 28 matches feature points only for the item candidates. Since the matching of the feature points is conducted for all combinations between a plurality of feature points included in each object region and feature points for each of items listed in the feature point file, a processing load is significantly high. In a case where 60 items can be displayed on a single item shelf and there are thousands of types of items to handle, the matching process is performed for 60× thousands of combinations with respect to one item image photographing a single item shelf, and thus takes a considerably long time. In this regard, in the present example embodiment, since the refined search unit 24 reduces thousands of items to a sufficiently smaller number of item candidates by using a hash table generated based on feature amounts, and matches feature points only for the item candidates, it is possible to significantly reduce processing time.

[Object Recognition Process]

Figure 8:
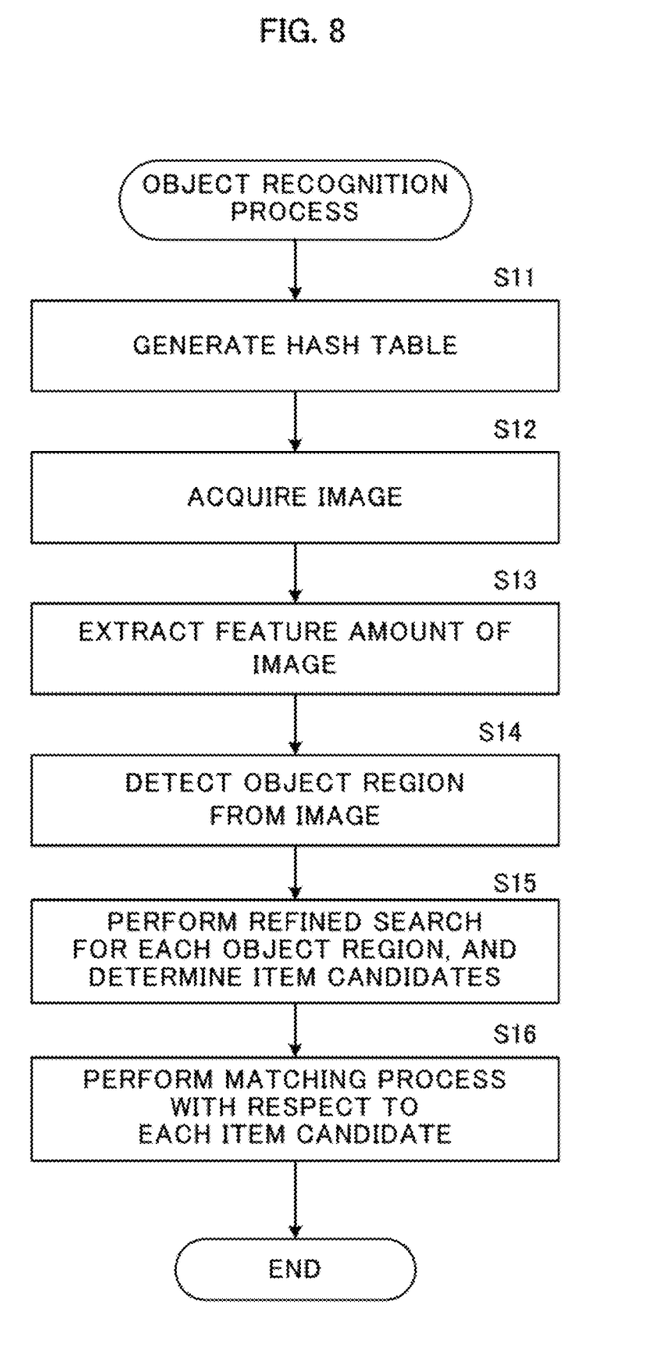
FIG. 8 is a flowchart of an object recognition process.

FIG. 8 is a flowchart of the object recognition process. This process is realized by the processor 12 illustrated in FIG. 2, which executes a program prepared in advance and operates as each element illustrated in FIG. 3. First, as a pre-process, the hash table generation unit 26 acquires feature amount information of all items to be recognized from the feature amount file, and generates a hash table (step S11).

Next, the image acquisition unit 21 acquires an item image (step S12), and the feature amount extraction unit 22 extracts feature amounts from the item image as illustrated in FIG. 5 (step S13). Next, the object region detection unit 23 detects an object region corresponding to each item as illustrated in FIG. 6 (step S14). Next, the refined search unit 24 refers to the hash table, performs a refined search based on the feature amounts of each object region, and determines item candidates (step S15). Subsequently, the matching unit 28 performs the matching process using the feature amounts of each object region and the feature amounts of each item candidate stored in the feature amount file, and outputs a recognition result for each object region (step S16). After that, the process is terminated.

[Modification]

Next, a modification of the above example embodiment will be described. The following modifications can be applied in combination as appropriate.

(Modification 1)

In the above-described example embodiment, first, the feature amount extraction unit 22 extracts feature amounts from an entire item image, and then the object region detection unit 23 detects each of object regions and divides the feature amounts based on the detected object regions to determine feature amounts for each object region. Instead, first, the object region detection unit 23 may detect each of the object regions, and the feature amount extraction unit 22 may extract the feature amounts from the image for each of the object regions.

(Modification 2)

The matching unit 28 can detect a rectangle of an item corresponding to an object region by performing matching between feature points included in the object region and feature points for each of items included in the feature amount file. In a case where a rectangle (hereinafter, referred to as an "object region rectangle") of the object region detected by the object region detection unit 23 and a rectangle (hereinafter, referred to as a "feature point matching rectangle") obtained by matching the feature points by the matching unit 28 differ greatly, the matching unit 28 may discard the matching result obtained for the object region. This is because a case where the object region rectangle and the feature point matching rectangle are greatly different is considered that accuracy of the detection process or the matching process of the object region is insufficient.

(Modification 3)

In the above-described example embodiment, the feature points are selected based on an object region rectangle detected by the object region detection unit 23, and the refined search by the refined search unit 24 and the matching process by the matching unit 28 are performed. At that time, not only the feature points existing within the object region rectangle but also the feature points existing around the object region rectangle may be used to perform at least one of the refined search and the matching process. Here, a "periphery" of the rectangle of the object region is, for instance, a region including a predetermined number of pixels outside the rectangle of the object region. By this region, even in a case where the object region detected by the object region detection unit 23 is slightly displaced with respect to a position of the actual item, it is possible to correctly recognize the item.

In addition, a portion of the feature points existing inside the rectangle of the object region may be used to perform the refined search and the matching process. For instance, the refined search unit 24 may perform the refined search using a part of the feature amounts in the object region rectangle, and the matching unit 28 may perform the matching by using all feature points in the object region rectangle. On the contrary, the refined search unit 24 may perform the refined search using all feature amounts in the object region rectangle, and the matching unit 28 may perform the matching by using a part of the feature points in the object region rectangle.

(Modification 4)

In a case where a number of matching indicates 0 (zero) as a result of the matching process which is performed by the matching unit 28 with respect to an object region detected by the object region detection unit 23, that is, a case where a corresponding item has not been found, the matching unit 28 may report a user that there is a possibility that a registration of the item has been omitted, or that there is a possibility that the item is an unregistered new product. Note that, an absence of item registration means that a feature amount file for that item is not prepared. For instance, the matching unit 28 displays an item image on the display device 17 or indicates a portion of the item in black, or may display a message. In addition, in a case of displaying an item name or the like as a matching result list on the display device 17, "unknown", "registration leakage?", "new product?" or the like may be displayed in a column of the item name.

In addition, when the matching result indicates 0 as described above, the matching unit 28 may report the user that there is a possibility of a related item such as a new label or a new series of an item as the item candidate determined by the refined search unit 24. For instance, in a case where the items A, D, and F are determined as item candidates by the refined search unit 24, the matching unit 28 may display a message of "there is a possibility of a new item of the items A, D, and F" on the display device 17.

(Modification 5)

The item shelf of a store is often arranged with items of almost the same size in each stage. Especially for beverages or the like, this tendency is high. Therefore, in a case where an area of a rectangle of the detected object region is significantly different from areas of rectangles of object regions adjacent on left and right, the object region detection unit 23 may remove the rectangles of the object regions as erroneous detection. In addition, the object region detection unit 23 may remove not only the rectangles of the object regions adjacent on right and left but also a rectangle of an object region having a significantly different area as compared with rectangles of other object regions on the same stage as the erroneous detection.

(Modification 6)

In a detection result of object regions by the object region detection unit 23, in a case where there is a region in which the object region is not detected (hereinafter, referred to as an "empty region") and a size of the empty region is large enough to accommodate the object region detected in the same stage of the item shelf, the object region detection unit 23 may add a rectangle having the same size as the rectangle of the object region detected in the same stage to the empty region. By this process, the refined search and the matching process are subsequently performed even on the empty region. Next, the matching unit 28 adopts that result when a matching result is finally obtained for the empty region (it is determined as either one of items), and the matching unit 28 may determine that there is no item in the empty region when the matching result is not obtained. Depending on a state of illumination with respect to the item shelf, an object region may not be detected in the item image, such as an item in a dark location. Also, an object region may not be detected in a case where items overlap with each other, or in a case where a price tag or the like overlaps an item. Thus, even in a case where the object region detection unit 23 fails to detect an object region from an item image, it is possible to compensate for the failure by adding an object region rectangle to the empty region.

(Modification 7)

In the above example embodiment, an object to be recognized in the object recognition apparatus 100 is an item such as a beverage; however, the object to be recognized may be an item other than the beverage. In that case, the object region is not necessarily rectangular, and may be polygonal or another complex outline. In addition, the object to be recognized is not limited to an item, and may be any of various objects stored in a shelf.

Second Example Embodiment

Figure 9:
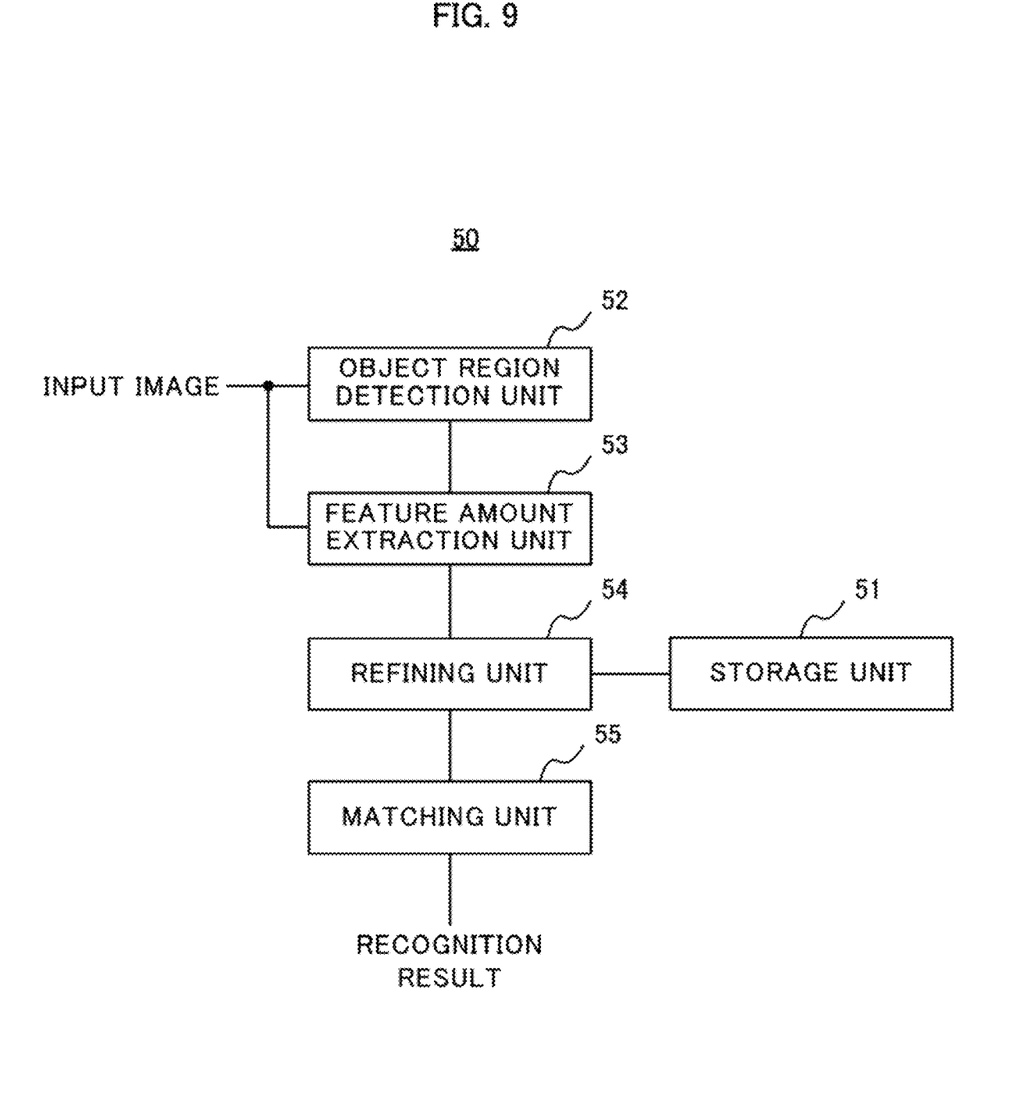
FIG. 9 illustrates an object recognition apparatus according to a second example embodiment.

FIG. 9 is a block diagram illustrating a functional configuration of an object recognition apparatus 50 according to a second example embodiment. The object recognition apparatus 50 includes a storage unit 51, an object region detection unit 52, a feature amount extraction unit 53, a refining unit 54, and a matching unit 55. The storage unit 51 stores a table in which a plurality of feature amounts are associated with each object having respective feature points of the feature amounts. The object region detection unit 52 detects object regions of a plurality of objects from an input image. The feature amount extraction unit 53 extracts a feature amount for each feature point from the input image. The refining unit 54 refers to the table and refines from all objects as recognition subjects to object candidates corresponding to an object region based on feature amounts of the feature points belonging to the object region. The matching unit 55 compares the feature amounts belonging to the object region with the feature amounts of each of the object candidates, recognizes the object, and outputs a recognition result.

A part or all of the example embodiments described above may also be described as the following supplementary notes, but not limited thereto.

(Supplementary Note 1)

1. An object recognition apparatus comprising:

a storage unit configured to store a table in that a plurality of feature amounts are associated with each object having feature points of respective feature amounts;

an object region detection unit configured to detect object regions of a plurality of objects from an input image;

a feature amount extraction unit configured to extract feature amounts of feature points from the input image;

a refining unit configured to refer to the table, and refine from all objects of recognition subjects to object candidates corresponding to the object regions based on feature amounts of feature points belonging to the object regions; and a matching unit configured to recognize the plurality of objects by matching the feature points belonging to each of the object regions with feature points for each of the object candidates, and output a recognition result.

(Supplementary Note 2)

2. The object recognition apparatus according to claim 1, wherein the refining unit votes on objects having feature amounts corresponding to respective feature amounts belonging to the object regions, and determines a plurality of objects with the highest number of votes as the object candidates.

(Supplementary Note 3)

3. The object recognition apparatus according to claim 1 or 2, wherein the matching unit detects each outline of the objects by matching the feature points, and discards a recognition result of an object when a region indicated by the detected outline is different from the object region of the object detected by the object region detection unit by a predetermined amount or more.

(Supplementary Note 4)

4. The object recognition apparatus according to any one of claims 1 through 3, wherein the feature amount extraction unit extracts the feature amounts even in a predetermined region around each of the object regions.

(Supplementary Note 5)

5. The object recognition apparatus according to any one of claims 1 through 4, wherein the matching unit matches the feature points including feature points existing in a predetermined region around each of the object regions.

(Supplementary Note 6)

6. The object recognition apparatus according to any one of claims 1 through 5, wherein the refining unit uses a part of the feature points included in the object regions, and the matching unit uses all feature points included in the object regions.

(Supplementary Note 7)

7. The object recognition apparatus according to any one of claims 1 through 5, wherein the refining unit uses all feature points included in the object regions, and the matching unit uses a part of the feature points included in the object regions.

(Supplementary Note 8)

8. The object recognition apparatus according to any one of claims 1 through 7, further comprising a table generation unit configured to acquire feature amounts of feature points for each of a plurality of objects, classify the acquired feature amounts into a plurality of groups, and generate the table by associating an object having feature amounts belonging to each of the groups with the feature amounts.

(Supplementary Note 9)

9. The object recognition apparatus according to any one of claims 1 through 8, further comprising a report unit configured to report, for an object region where a recognition result has not been acquired by the matching unit, that an object existing in the object region is unregistered.

(Supplementary Note 10)

10. The object recognition apparatus according to claim 9, wherein the report unit reports that the object existing in the object region is an object related to an object candidate determined by the refining unit with a high possibility.

(Supplementary Note 11)

11. The object recognition apparatus according to any one of claims 1 through 10, wherein the matching unit discards, as an erroneous detection, a recognition result acquired for an object region which area differs from respective areas of object regions on right and left by a predetermined value or more.

(Supplementary Note 12)

12. The object recognition apparatus according to any one of claims 1 through 10, wherein the objects are arranged on a shelf, and the matching unit discards, as an erroneous detection, a recognition result acquired for an object region which area differs from an area of another object region on the same stage of the shelf by a predetermined value or more.

(Supplementary Note 13)

13. The object recognition apparatus according to any one of claims 1 through 12, wherein the object region detection unit adds an object region having the same size as adjacently detected object regions when an empty region where an object region is not detected has an area equal to or larger than the adjacently detected object regions.

(Supplementary Note 14)

14. An object recognition method, comprising:

detecting object regions of a plurality of objects from an input image;

extracting feature amounts of feature points from the input image;

referring to a table in that a plurality of feature amounts are associated with each object having feature points of respective feature amounts, and refining from all objects of recognition subjects to object candidates corresponding to the object regions based on feature amounts of feature points belonging to the object regions; and recognizing the plurality of objects by matching the feature points belonging to each of the object regions with feature points for each of the object candidates, and outputting a recognition result.

(Supplementary Note 15)

15. A recording medium storing a program, the program causing a computer to perform a process comprising:

detecting object regions of a plurality of objects from an input image;

extracting feature amounts of feature points from the input image;

referring to a table in that a plurality of feature amounts are associated with each object having feature points of respective feature amounts, and refining from all objects of recognition subjects to object candidates corresponding to the object regions based on feature amounts of feature points belonging to the object regions; and recognizing the plurality of objects by matching the feature points belonging to each of the object regions with feature points for each of the object candidates, and outputting a recognition result.

While the invention has been described with reference to the example embodiments and examples, the invention is not limited to the above example embodiments and examples. It will be understood by those of ordinary skill in the art that various changes in form and details may be made therein without departing from the spirit and scope of the present invention as defined by the claims.

DESCRIPTION OF SYMBOLS

21 Image acquisition unit
22 Feature amount extraction unit
23 Object region detection unit
24 Refined search unit
25 Feature amount file storage unit
26 Hash table generation unit
27 Feature amount file reading unit
28 Matching unit
100 Object recognition apparatus

What is claimed is:

1. An object recognition apparatus comprising:
a memory storing instructions; and
one or more processors configured to execute the instructions to:
store a table in which, for each of a plurality of first objects, hash values for feature amounts of a plurality of first feature points for the first object are associated with the first object;
detect object regions of a plurality of second objects arranged on a shelf, from an input image;
extract, for each object region, feature amounts of second feature points within the object region;
determine, for each object region, hash values for the feature amounts of the second feature points within the object region;
determine, for each object region, a number of the feature amounts of the second feature points within the object region for which the hash values are associated with the first objects within the table;
identify which of the second objects are candidate objects, based on the determined numbers for the object regions of the second objects;
recognize, each second object that is a candidate object by matching the second feature points within the object region of the second object with the first feature points of the first objects;
discard, as an erroneous detection, a recognition result acquired for any candidate object for which the object region differs in area by a predetermined value or more from another object region on a same stage of the shelf; and
output the recognition result for each candidate object that has not been discarded.

2. The object recognition apparatus according to claim 1, wherein, the processor identifies which of the second objects are the candidate objects as the second objects having the object regions that for which the determined numbers are highest.

3. The object recognition apparatus according to claim 1, wherein, for each object region, the processor detects an outline of the second object by matching the second feature points within the object region, and discards the recognition result of the second object when the detected outline is different from the object region by a predetermined amount or more.

4. The object recognition apparatus according to claim 1, wherein, for each object region, the processor extracts the second feature amounts even in a predetermined region around the object region.

5. The object recognition apparatus according to claim 1, wherein the processor matches the second feature points in a predetermined region around the object region.

6. The object recognition apparatus according to claim 1, wherein
the processor uses a part of the second feature points included in the object region when determining the number for the object region, and
the processor uses all the second feature points included in the object region when matching the second feature points.

7. The object recognition apparatus according to claim 1, wherein
the processor uses all the second feature points included in the object region when determining the number for the object region, and the processor uses a part of the second feature points included in the object region when matching the second feature points.

8. The object recognition apparatus according to claim 1, wherein the processor is further configured to report each second object that is a candidate object but for which no recognition result has been acquired by matching the second feature points.

9. The object recognition apparatus according to claim 8, wherein the processor reports for each second object that is a candidate object for which no recognition result has been acquired, another candidate object to which the second object is related with a high possibility.

10. The object recognition apparatus according to claim 1, wherein the processor discards, as an erroneous detection, the recognition result acquired for any candidate object for which the object region differs in area by a predetermined value or more from the object regions on right and left.

11. The object recognition apparatus according to claim 1, wherein the processor adds an object region having a same size as adjacently detected object regions when an empty region where no object region is detected has an area equal to or larger than the adjacently detected object regions.

12. An object recognition method performed by a computer and comprising:
   storing a table in which, for each of a plurality of first objects, hash values for feature amounts of a plurality of first feature points for the first object are associated with the first object;
   detecting object regions of a plurality of second objects from an input image;
   extracting, for each object region, feature amounts of second feature points within the object region;
   determining, for each object region, hash values for the feature amounts of the second feature points within the object region;
   determining, for each object region, a number of the feature amounts of the second feature points within the object region for which the hash values are associated with the first objects within the table;
   identifying which of the second objects are candidate objects, based on the determined numbers for the object regions of the second objects;
   recognizing, each second object that is a candidate object by matching the second feature points within the object region of the second object with the first feature points of the first objects;
   discarding, as an erroneous detection, a recognition result acquired for any candidate object for which the object region differs in area by a predetermined value or more from another object region on a same stage of the shelf; and
   outputting the recognition result for each candidate object that has not been discarded.

13. A non-transitory computer-readable recording medium storing a program causing a computer to perform a process comprising:
   storing a table in which, for each of a plurality of first objects, hash values for feature amounts of a plurality of first feature points for the first object are associated with the first object;
   detecting object regions of a plurality of second objects from an input image;
   extracting, for each object region, feature amounts of second feature points within the object region;
   determining, for each object region, hash values for the feature amounts of the second feature points within the object region;
   determining, for each object region, a number of the feature amounts of the second feature points within the object region for which the hash values are associated with the first objects within the table;
   identifying which of the second objects are candidate objects, based on the determined numbers for the object regions of the second objects; recognizing, each second object that is a candidate object by matching the second feature points within the object region of the second object with the first feature points of the first objects;
   discarding, as an erroneous detection, a recognition result acquired for any candidate object for which the object region differs in area by a predetermined value or more from another object region on a same stage of the shelf; and
   outputting the recognition result for each candidate object that has not been discarded.

* * * * *